United States Patent [19]
Hofmann

[11] 3,808,044
[45] Apr. 30, 1974

[54] PRODUCTION OF DEFINED SURFACE RESISTANCE IN CERAMIC BODIES

[75] Inventor: Horst Hofmann, Munich, Germany

[73] Assignee: Siemens Aktiengesellschaft, Berlin & Munich, Germany

[22] Filed: July 21, 1971

[21] Appl. No.: 164,913

[30] Foreign Application Priority Data
July 24, 1970 Germany............................ 2036832

[52] U.S. Cl. ......... 117/221, 117/124 B, 117/124 T, 65/60
[51] Int. Cl........................ B44d 1/02, C03c 17/00
[58] Field of Search ............ 117/221, 124 B, 124 T; 106/1; 65/60

[56] References Cited
UNITED STATES PATENTS

| | | | |
|---|---|---|---|
| 3,460,956 | 8/1969 | Dahle | 117/124 B |
| 3,036,018 | 5/1962 | Peras | 117/221 |
| 3,004,875 | 10/1961 | Lytle | 117/124 T |
| 2,908,593 | 10/1959 | Naidus | 117/124 T |
| 2,746,888 | 5/1956 | Ross | 117/221 |
| 3,215,555 | 11/1965 | Krey | 65/60 |

OTHER PUBLICATIONS

Bennett, Concise Chemical & Technical Dictionary, pg. 984, Chemical Publishing Co., Inc, N.Y., N.Y., (1947).

*Primary Examiner*—Leon D. Rosdol
*Assistant Examiner*—M. F. Esposito
*Attorney, Agent, or Firm*—Hill, Sherman, Meroni, Gross & Simpson

[57] ABSTRACT

A method of reducing surface resistance of ceramic bodies by coating the surface of a ceramic body with a metal salt solution and then subjecting the coated ceramic body to sintering conditions favorable for the formation of ceramic-metal combinations. A preferred metal salt solution comprises 32 grams of lithium polymolybdate (metal salt), 80 milligrams of lithium fluoride (wetting agent), 4 to 6 milliliters of aqueous methyl cellulose (organic binder) and 100 milliliters of deionized water. Comparable solutions of titanium are also included. Sintering conditions include temperatures of 1,000° to 1,300°C. in a decomposable gas atmosphere for about 30 minutes and then cooling in a dry inert gas atmosphere.

3 Claims, No Drawings

PRODUCTION OF DEFINED SURFACE RESISTANCE IN CERAMIC BODIES

BACKGROUND OF THE INVENTION

1. Field of the Invention

The invention relates to producing defined surface resistance in dielectrics and more particularly to methods of reducing surface resistance in ceramic bodies.

2. Prior Art

Generally ceramic bodies have a surface resistance in the order of about $10^{14}$ through $10^{16}$ ohms per square. The resistance of a squared surface is independent of the size of the square and is only dependent on resistivity and thickness of the body under consideration. See HANDBOOK OF THIN FILM TECHNOLOGY, "Sheet Resistance," (McGraw-Hill Book Company). With the increased availability of aluminum oxide ceramics, the field of use for ceramics has widely increased, primarily due to the increased recognition of metal-ceramic technology. In certain applications, such as in the production of particle accelerator elements, it is advantageous to produce defined surface resistance and/or to reduced surface resistance in ceramic bodies in the order to several powers of ten. Due to the size of ceramic bodies involved in such applications, it is desirable to avoid the use of vacuum and/or evaporation apparatus. Since in operational environments, such ceramic bodies are occasionally subjected to friction, any conductive layer applied to the ceramic bodies should be wear-resistant, independently of the type of ceramic body. Additionally, it is desirable to effect any heat treatment of the conductive layers simultaneously with the production of metal-ceramic combinations, such as during the required sintering process. Present day technology has failed to provide the desired results in an acceptable manner.

SUMMARY OF THE INVENTION

The invention provides a method of producing defined surface resistance in ceramic bodies, preferably of the aluminum oxide type, and is generally comprised of coating the surface of a ceramic body with an aqueous metal salt solution, which includes a soluble metal salt, a wetting agent, an organic binder and water and in certain embodiments then subjecting the coated ceramic body to sintering conditions conducive to the formation of metal-ceramic combinations. The invention also provides a metal salt solution for providing select amounts of metal onto an aqueous receptive body.

Preferred metal salts include lithium polymolybdate and organic titanates, such as tetraisopropyl orthotitanate. A preferred wetting agent is lithium fluoride and a preferred organic binder is methyl cellulose. The preferred method of coating is by submerging a ceramic body into a metal salt bath. The preferred sintering conditions include heating to temperatures in the range of about 1,000° to 1,300° C. for about 10 to 60 minutes in a decomposable gas atmosphere (a moist and/or inert gas), first under weekly oxidizing conditions and then under reducing conditions. Initial cooling is effected in an inert atmosphere.

DESCRIPTION OF THE PREFERRED EMBODIMENTS

In accordance with the principles of the invention, a metallizing solution (i.e. a metal-salt solution) is provided which readily combines or reacts with a receptive body, such as an aluminum oxide ceramic body. During at least the sintering process of the solution coated body, spinels and semiconductors oxides are formed due to solid-body reactions and define surface resistance of the body. A receptive body, such as a ceramic body, includes small fissures, pores or the like which tend to retain the metallized solution when the solution is coated, as by spray, dip, brush, etc. onto the body. During the subsequent heat treatment, the outer surface of, for example a ceramic body is permeated with more or less metallic inclusions or the like, generally depending upon the concentration and content of the metal salt and binder in the initial metallizing solution. Under extreme circumstances it is possible to produce a conductive metal layer on a ceramic body due to an excessive concentration of such metallic inclusions.

A preferred metallizing (metal-salt) solution includes a suitable metal salt soluble in aqueous solutions and compatible with ceramics. Preferably a portion of the metal is capable of reacting with aluminum oxide ceramics to form spinels or the like. The preferred metal salts are selected from the group consisting of lithium polymolybdate, tetraisopropyl orthotitanate, organic titanates and similar metal salts.

Compatible wetting agents are also included in the metallizing solution as an aid in providing intimate contact between the surface of the body being treated and the solution. Only relatively small amounts of wetting agents are necessary for the desired function. A preferred wetting agent is lithium fluoride. Similar materials utilized in the manufacture of vitreous enamels and glazes are also useful. Inclusions of small of amounts of, for example lithium fluoride in the metallizing solution provides the desired wetting characteristics and accelerates (or even initiates) the solid-body reaction with the ceramic surfaces.

A binder material is also included in the metallizing solution as an aid in retaining a layer of a select thickness of the solution on the ceramic body. Relatively small amounts of binder are sufficient and by increasing the amounts of binder in the solution, a greater layer thickness is readily achieved. The binder material is preferably organic and heat-decomposable without harmful residue. A preferred organic material is methyl cellulose, however other varnishes, lacquers, alkyds, etc. are also useful. The binder allows layer thicknesses of from about 1 to 15 millimicrons ($\mu$m).

A receptive body, such as for example an aluminum oxide ceramic, is provided with a generally uniform surface coating of the metallizing solution by a variety of techniques. Preferably the body is submerged in a suitable bath of the metallizing solution, however spray, dip, brush, applicator bar, etc. and similar liquid coating techniques are also useful.

After the coating step the solution-coated body is dried, as in air, and is subjected to sintering conditions conducive to the formation of metal-ceramic combinations. Preferably the coated body is sintered at temperatures of about 1,000° to 1,300° C for periods of time ranging from about 10 to 60 minutes in a decomposable gas atmosphere. Thereafter the sintered body is initially cooled in an inert atmosphere, for example to about room temperature and at least below about 800° C. The decomposable gas atmosphere includes weakly oxidizing gases, for example moist air, or an inert gas ($H_2$, $N_2$, etc.) containing a small amount of $O_2$ and/or moisture; the decomposable gas also includes reducing gases, for example relatively pure $H_2$ gas or the like.

A preferred embodiment of the metallizing solution comprises of about 32 grams of lithium polymolybdate (thought to be 2 $Li_2O$ 3 $MoO_3$), about 80 milligrams of lithium fluoride, about 4 to 6 milliliters of a 10 percent aqueous methyl cellulose solution and about 100 milliliters deionized water. Analogous solutions of organic titanates are also useful, as for example solutions of tetraisopropyl orthotitanate.

The surface resistance of ceramic bodies treated in accordance with the principles of the invention is on the order of about $10^{10}$ ohms per square or lower, depending at least in part on the thickness of the layer of metallizing solution coated onto the ceramic body and/or the sintering temperature utilized. For example, a surface layer of about $2 \pm 1$ μm produces surface resistance of about $1 - 3 \cdot 10^{10}$ ohms per square whereas surface layers of about 15 μm produces surface resistance of about $1 \cdot 10^2$ ohms per square.

In order to further illustrate the principles of the invention but not limit the scope thereof, the following exemplary embodiments are set forth.

EXAMPLE I

An aluminum oxide ceramic material formed into a suitable body was cleansed in a conventional manner and submerged in a metallizing solution. The solution contained 32 grams of lithium polymolybdate, 80 milligrams of lithium fluoride, about 4 milliliters of a 10 percent aqueous methyl cellulose solution and 100 milliliters of deionized water. The body remained in contact with the solution for a few moments and was then removed and the adhering layer of solution (about $2 \pm 1$ μm) was dried in air. The coated body was then subjected to a temperature of about 1,000° C. in a moist weakly oxidizing decomposable gas atmosphere for about 10 to 30 minutes and then similarly heat treated in a dry reducing (decomposable) gas atmosphere and cooled in an inert atmosphere. Analytical analysis detected disturbed (or interfered) grid structure of α $Al_2O_3$ lithium-aluminate spinels (i.e., $Li_2O \cdot 5Al_2O_3$) and molybdenum portions as metallic inclusions on or in the surface of the body when relatively pure aluminum oxide was utilized. The measured surface resistance of the treated body was $1 - 3 \cdot 10^{10}$ ohm per square.

EXAMPLE II

A ceramic body similar to the one utilized in Example I was cleansed and coated with an aqueous metal salt solution. The solution was substantially identical to the solution of Example I except that the proportion of methyl cellulose was increased to about 6 milliliters. The resulting solution layer had a thickness of about $15 \pm 1$ μm. After sintering under essentially identical conditions as used in Example I, except that in the instant case, the temperature of about 1,300° C. was utilized, the measured surface resistance of the body was only $1.1 \cdot 10^2$ ohms per square, which is a very low resistance.

EXAMPLE III

A metallizing solution containing tetraisopropyl orthotitanate was prepared including a wetting agent and a binder and placed in a container to form a bath. A suitable ceramic body, which was suitably cleansed, was submerged into this bath and then removed and the adhering layer of solution air dried. The coated body was then subjected to sintering conditions conducive to the formation of metal-ceramic combinations as described in Example I. Analysis of the resulting structure, indicated that titanium oxides generally corresponding to the formula $TiO_{2-x}$ (wherein x is an integer) were present in addition to aluminum-titanate combinations. The surface resistance of the treated ceramic body was about $5 - 7 \cdot 10^{10}$ ohms per square.

In summation, the invention provides a method of producing defined surface resistance in ceramic bodies comprising coating the ceramic body with an aqueous metal-salt solution and subjecting the coated body to sintering conditions conducive to the formation of metal-ceramic combinations. The invention also provides an aqueous metal-salt solution for providing select amounts of metal on a receptive body consisting essentially of a metal salt, a wetting agent, and an organic binder.

The specification presents a detailed disclosure of the preferred embodiments set forth and it is to be understood that the invention is not limited to the specific forms or embodiments disclosed but that it covers all modifications, variations, changes and alternative or equivalent modes and materials falling within the scope and spirit of the principles taught by the invention.

I claim as my invention:

1. A method of producing defined surface resistance in ceramic bodies comprising;
    applying an aqueous metal-salt solution which tends to be retained onto a body composed of aluminum oxide ceramic material and provides select amounts of a metal that undergoes solid-body reactions and sintering conditions with said aluminum oxide ceramic material onto at least one surface of said body by briefly contacting said solution with said one surface for producing a metal-salt coated ceramic surface;
    said metal-salt solution comprising a mixture of water, a relatively small amount of lithium fluoride, a relatively small amount of methyl cellulose and a relatively small amount of lithium polymolybdate; and
    subjecting said coated ceramic surface to sintering conditions conductive to solid-body reactions between aluminum oxide ceramic material and said metal for the formation of metal-ceramic combinations including heating said coating ceramic surface to temperatures in the range of about 1,000° C. to 1,300° C. for periods of time ranging from about 10 to 60 minutes, first in a weakly oxidizing atmosphere, then in a reducing atmosphere and then cooling the heated surface to at least below about 800° C. in an inert atmosphere.

2. A method of producing defined surface resistance in ceramic bodies as defined in claim 1 wherein said aqueous metal salt solution consists essentially of about 32 grams of lithium polymolybdate, about 80 milligrams of lithium fluoride, about 4 to 6 milliliters of aqueous methyl cellulose solution and about 100 milliliters of deionized water.

3. A method of producing defined surface resistance in ceramic bodies comprising;
    applying an aqueous generally uniform outer layer of a metal-salt solution which tends to be retained onto a body composed of aluminum oxide ceramic material and provide select amounts of a metal that undergoes solid-body reactions at sintering conditions with said aluminum oxide ceramic material onto at least one surface of said body by briefly contacting said solution with said one surface to produce a metal-salt coated ceramic surface;

said metal-salt solution consisting essentially of about 32 grams of lithium polymolybdate, about 80 milligrams of lithium fluoride, about 4 through 6 milliliters of a 10 percent aqueous methyl cellulose solution and about 100 milliliters of deionized water; and subjecting said coated surface to sintering conditions conducive to solid-body reactions between aluminum oxide ceramic materials and said metal for the formation of metal-ceramic combinations including heating said coated ceramic surface to temperatures in the range of about 1,000° to 1,300° C. for periods of time ranging from about 10 to 60 minutes, first in a weakly oxidizing atmosphere, then in a reducing atmosphere and then cooling the heated surface to at least below 800° C. in an inert atmosphere.

* * * * *